United States Patent [19]

Nilssen

[11] Patent Number: 4,985,664

[45] Date of Patent: Jan. 15, 1991

[54] ELECTRONIC BALLAST WITH HIGH POWER FACTOR

[76] Inventor: Ole K. Nilssen, Caesar Dr., Barrington, Ill. 60010

[21] Appl. No.: 429,209

[22] Filed: Oct. 12, 1989

[51] Int. Cl.$^5$ ............................................ H05B 41/00
[52] U.S. Cl. .................. 315/209 R; 315/172; 315/200 R; 315/283; 315/DIG. 5
[58] Field of Search ................ 315/172, 200 R, 205, 315/209 R, 227 R, 283, DIG. 5

[56] References Cited

U.S. PATENT DOCUMENTS

4,782,268 11/1988 Fahnrich et al. ............ 315/209 R X

Primary Examiner—David Mis

[57] ABSTRACT

In a power-line-operated electronic ballast, an inverter converts a DC voltage to a high frequency current-limited operating voltage for a fluorescent lamp. The DC voltage is obtained, at least in part, by forward conversion of full-wave-rectified unfiltered power line voltage; which forward conversion is accomplished by high frequency switching of an energy-storing inductor, the switching being done by the very same inverter that provides the high frequency lamp operating voltage. As an overall result, power is drawn from the power line with a power factor higher than 98% and with a total harmonic distortion well under 20%.

14 Claims, 4 Drawing Sheets

ELECTRONIC BALLAST WITH HIGH POWER FACTOR

FIELD OF THE INVENTION

The present invention relates to high-power-factor power-line-operated electronic ballasts for gas discharge lamps.

BACKGROUND OF THE INVENTION

In general, to meet industry requirements, a gas discharge lamp ballast has to draw power from the power line with a power factor of at least 90%. However, with many electronic ballasts, even at a power factor above 90%, the resulting harmonic distortion of the current drawn from the power line may be unacceptably high, particularly with respect to the so-called odd triplet harmonics.

In an electronic ballast, which generally requires a well filtered DC voltage for operating an inverter that powers the gas discharge lamp, by applying unfiltered full-wave-rectified power line voltage to a high frequency forward converter, such well filtered DC voltage may be attained without incurring any substantial harmonic distortion of the current drawn from the power line. However, the cost penalty associated with providing a forward converter in an electronic ballast is substantial.

SUMMARY OF THE INVENTION

Objects of the Invention

An object of the present invention is the provision, in a power-line-operated electronic ballast for gas discharge lamps or other inverter-type electronic power supplies, of a more cost-effective means for attaining acceptably high power factor and low harmonic distortion with respect to the current drawn by the ballast from the power line.

This as well as other objects, features and advantages of the present invention will become apparent from the following description and claims.

BRIEF DESCRIPTION

In a power-line-operated electronic gas discharge lamp ballast, an inverter converts a DC voltage of substantially constant magnitude to a high frequency current-limited operating voltage for a fluorescent lamp. The substantially constant magnitude DC voltage exists across an energy-storing capacitor and is obtained, at least in part, by forward conversion of full-wave-rectified 120 Volt/60 Hz power line voltage. The forward conversion is accomplished by high frequency switching of an energy-storing inductor, with the high frequency switching being done by the very same inverter that provides the high frequency lamp operating voltage. To improve efficiency, part of the energy supplied to the inverter from the DC voltage is derived directly from the full-wave-rectified power line voltage—at or near the peak of its instantaneous absolute magnitude—without being subjected to forward conversion.

DESCRIPTION OF THE PREFERRED EMBODIMENT

Details of Construction

Figure 1:
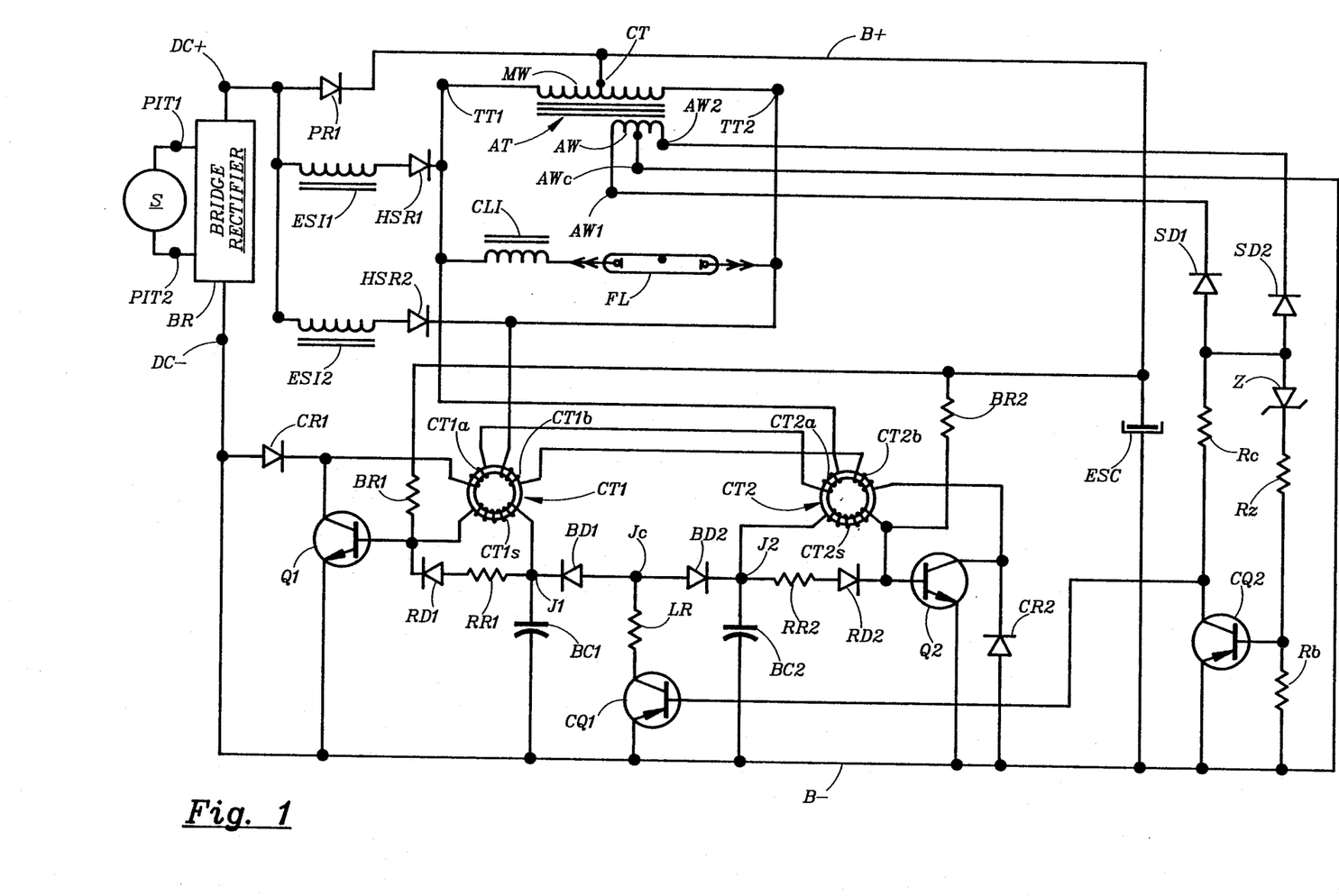
FIG. 1 schematically illustrates the invention in its main preferred embodiment.

FIG. 1 schematically illustrates the main preferred embodiment of the invention in the form of an electrical circuit diagram.

In FIG. 1, a source S represents an ordinary 120 Volt/60 Hz electric utility power line; which source S is connected with power input terminals PIT1 and PIT2 of a bridge rectifier BR. The output terminals of bridge rectifier BR are designated DC− and DC+, with DC− designating negative polarity.

The DC− terminal is directly connected with a B− bus; while the DC+ terminal is connected with a B+ bus by way of a power rectifier PR1, whose cathode is connected with the B+ bus. An energy-storing capacitor ESC is connected between the B− bus and the B+ bus.

An auto transformer AT has a main winding MW with transformer terminals TT1 and TT2, as well as a center-tap CT connected with the B+ bus. Also, transformer AT has an auxiliary winding AW with a center-tap AWc connected with the B− bus as well as two terminals AW1 and AW2 connected with the cathodes of two signal diodes SD1 and SD2, respectively, whose anodes are both connected with the anode of a Zener diode Z.

A first energy-storing inductor ESI1 is connected between the DC+ terminal and the anode of a first high speed rectifier HSR1, whose cathode is connected with transformer terminal TT1. A second energy-storing inductor ESI2 is connected between the DC+ terminal and the anode of a second high speed rectifier HSR2, whose cathode is connected with transformer terminal TT2.

A first inverter transistor Q1 is connected with its emitter to the B− bus and with its collector to the cathode of a first commutating rectifier CR1, whose anode is connected with the B− bus. A second inverter transistor Q2 is connected with its emitter to the B− bus and with its collector to the cathode of a second commutating rectifier CR2, whose anode is connected with the B− bus.

A first saturable current transformer CT1 has a secondary winding CT1s connected between the base of transistor Q1 and a junction J1. A second saturable current transformer CT2 has a secondary winding CT2s connected between the base of transistor Q2 and a junction J2.

A first bias capacitor BC1 is connected between junction J1 and the B− bus. A second bias capacitor BC2 is connected between junction J2 and the B− bus. A first bias diode BD1 is connected with its cathode to junction J1 and with its anode to a junction Jc. A second bias diode BD2 is connected with its cathode to junction J2 and with its anode to junction Jc. A first reset diode RD1 is connected with its cathode to the base of transistor Q1. A second reset diode RD2 is connected with its cathode to the base of transistor Q2. A reset resistor RR1 is connected between the anode of reset diode RD1 and junction J1. A reset resistor RR2 is connected between the anode of reset diode RD2 and junction J2.

A current-limiting inductor CLI is connected in series with a fluorescent lamp FL to form a series-combination; which series-combination is connected between transformer terminals TT1/TT2.

A first primary winding CT1a of current transformer CT1 is connected in series with a first primary winding CT2a of current transformer CT2 to form a first series-combination; and this first series-combination is connected between the collector of transistor Q1 and transformer terminal TT1.

A second primary winding CT2b of current transformer CT2 is connected in series with a second primary winding CT1b of current transformer CT1 to form a second series-combination; and this second series-combination is connected between the collector of transistor Q2 and transformer terminal TT2.

A first bias resistor BR1 is connected between the base of transistor Q1 and the B+ bus. A second bias resistor BR2 is connected between the base of transistor Q2 and the B+ bus.

A control transistor CQ1 connects with its emitter to the B− bus and, via a leakage resistor LR, with its collector to junction Jc. The base of transistor CQ1 connects with the collector of a control transistor CQ2, whose emitter and base are respectively connected with the B− bus and the cathode of Zener diode Z via a resistor Rz. A resistor Rb connects between the base and the emitter of transistor CQ2. A resistor Rc connects between the anode of Zener diode Z and the collector of transistor CQ2.

Figure 3:
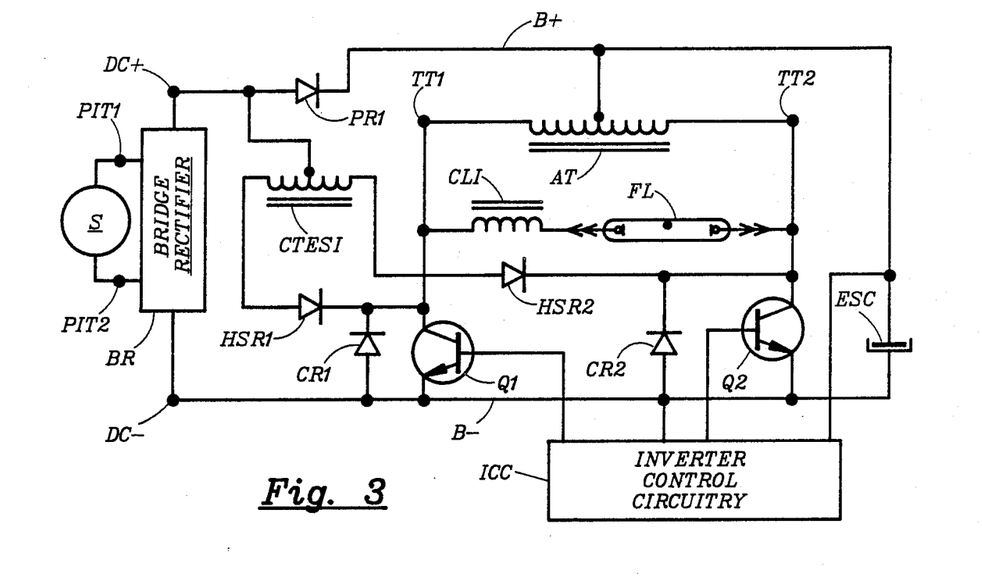
FIG. 3 schematically illustrates a first alternative version of the preferred embodiment.

FIG. 3 illustrates a first alternative version of the preferred embodiment of the invention; which first alternative version is identical to the main preferred version of FIG. 1 except that energy-storing inductors ESI1 and ESI2 have been replaced by a single center-tapped energy-storing inductor CTESI, whose center-tap is connected with the DC+ terminal and whose other two terminals are connected with the anodes of high speed rectifiers HSR1 and HSR2. Otherwise, for sake of clarity, the totality of the inverter control circuitry is represented by a single element referred-to as ICC; which element is connected with the B− bus, the B+ bus, the base of transistor Q1, and the base of transistor Q2.

Figure 4:
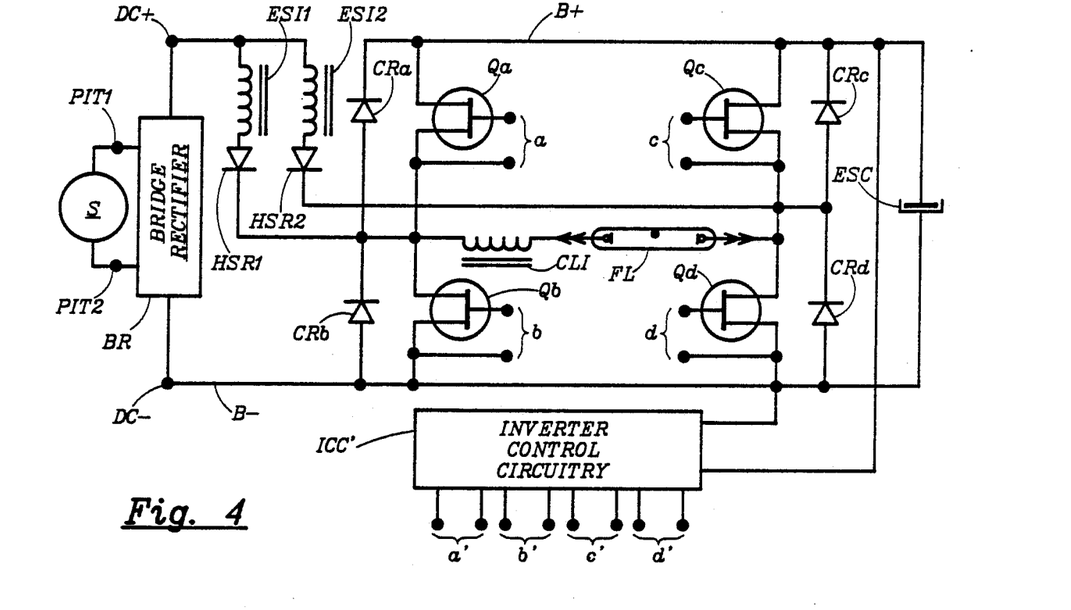
FIG. 4 schematically illustrates a second alternative version of the preferred embodiment.

FIG. 4 illustrates a second alternative version of the preferred embodiment; which second alternative version is a full bridge version of the arrangement of FIG. 1.

More particularly, in FIG. 4—just as in FIG. 1— power line source S is connected with bridge rectifier BR, thereby to provide an unfiltered full-wave-rectified power line voltage between terminals DC− and DC+.

A first field effect transistor Qa is connected with its drain to the B+ bus and with its source to the drain of a second field effect transistor Qb, whose source is connected with the B− bus. A third field effect transistor Qc is connected with its drain to the B+ bus and with its source to the drain of a fourth field effect transistor Qd, whose source is connected with the B− bus.

Each of transistors Qa, Qb, Qc and Qd has a set of control input terminals—a, b, c and d respectively—with each set of control input terminals being connected with the gate and the source of its associated transistor.

First energy-storing inductor ESI1 is connected between the DC+ terminal and the anode of first high speed rectifier HSR1, whose cathode is connected with the drain terminal of field effect transistor Qb. Second energy-storing inductor ESI2 is connected between the DC+ terminal and the anode of second high speed rectifier HSR2, whose cathode is connected with the drain terminal of field effect transistor Qd.

A commutating rectifier CRa is connected with its cathode to the drain terminal and with its anode to the source terminal of transistor Qa; a commutating rectifier CRb is connected with its cathode to the drain terminal and with its anode to the source terminal of transistor Qb; a commutating rectifier CRc is connected with its cathode to the drain terminal and with its anode to the source terminal of transistor Qc; and a commutating rectifier CRd is connected with its cathode to the drain terminal and with its anode to the source terminal of transistor Qd.

As before, current-limiting inductor CLI is connected in series with fluorescent lamp FL to form a series-combination; which series-combination is connected between the drain terminal of transistor Qb and the drain terminal of transistor Qd.

Also as before, energy-storing capacitor ESC is connected between the B− bus and the B+ bus.

Inverter control circuitry ICC' is connected with the B− bus, the B+ bus, and—by way of its control output terminals a', b', c' and d'—with corresponding control input terminals a, b, c and d of transistors Qa, Qb, Qc and Qd, all respectively.

Figure 5:
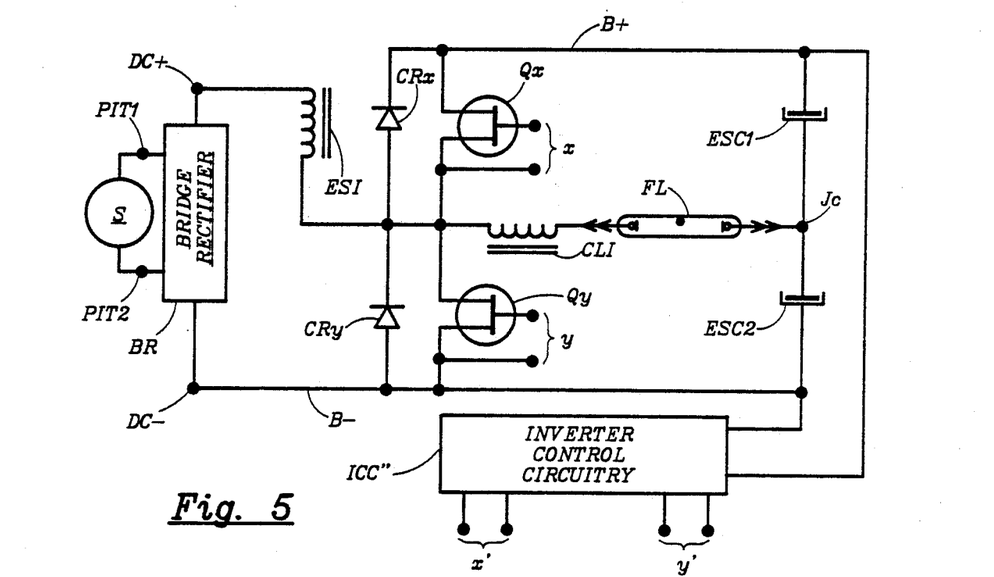
FIG. 5 schematically illustrates a third alternative version of the preferred embodiment.

FIG. 5 illustrates a third alternative version of the preferred embodiment; which third alternative version is a half-bridge version of the arrangement of FIG. 4.

More particularly, in FIG. 5—just as in FIG. 1— power line source S is connected with bridge rectifier BR, thereby to provide unfiltered full-wave-rectified power line voltage between terminals DC− and DC+.

A first field effect transistor Qx is connected with its drain terminal to the B+ bus and with its source terminal to the drain terminal of a second field effect transistor Qy, whose source terminal is connected with the B− bus.

Each of transistors Qx and Qy has a set of control input terminals—x and y, respectively—with each set of control input terminals being connected with the gate and the source of its associated transistor.

An energy-storing inductor ESI is connected between the DC+ terminal and the drain terminal of transistor Qy.

A commutating rectifier CRx is connected with its cathode to the drain terminal and with its anode to the source terminal of transistor Qx; and a commutating rectifier CRy is connected with its cathode to the drain terminal and with its anode to the source terminal of transistor Qy.

As before, current-limiting inductor CLI is connected in series with fluorescent lamp FL to form a series-combination; which series-combination is connected between the drain terminal of transistor Qy and a junction Jc.

A first energy-storing capacitor ESC1 is connected between junction Jc and the B+ bus. A second energy-storing capacitor ESC2 is connected between junction Jc and the B− bus.

Inverter control circuitry ICC" is connected with the B— bus, the B+ bus, and—by way of its control output terminals x' and y'—with control input terminals x and y of transistors Qx and Qy, all respectively.

DETAILS OF OPERATION

Figure 2:
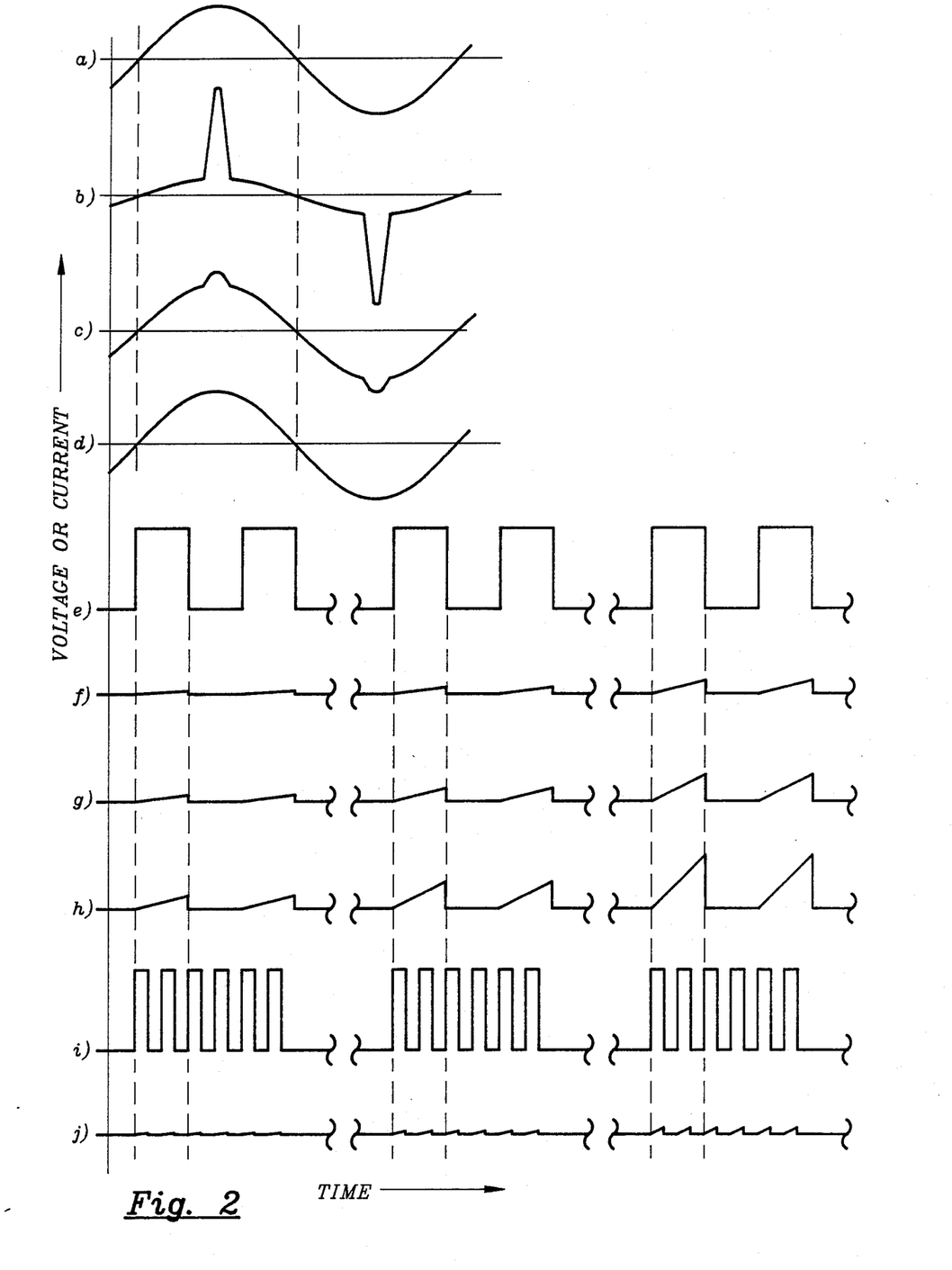
FIG. 2 shows various current and voltage waveforms associated with the operation of the main preferred embodiment.

FIG. 2 indicates various current and voltage waveforms illustrative of the operation of the arrangement of FIG. 1.

FIG. 2a shows the waveform of the 120 Volt/60 Hz power line voltage.

FIG. 2b shows the waveform of the current drawn from the power line when operating the circuit under a condition where the inductance values of inductors ESI1 and ESI2 are each of a relatively high magnitude.

FIG. 2c shows the waveform of the current drawn from the power line when operating the circuit under a condition where the inductances of inductors ESI1 and ESI2 are each of a medium magnitude.

FIG. 2d shows the waveform of the current drawn from the power line when operating the circuit under a condition where the inductance values of inductors ESI1 and ESI2 are each of a relatively low magnitude.

FIG. 2e shows the waveform of the squarewave voltage present between the B— bus and the collector of transistor Q1.

For each of three different values of the instantaneous magnitude of the DC supply voltage present between the DC— and the DC+ terminals:

FIG. 2f shows the waveform of the current flowing through energy-storing inductor ESI1 under the condition associated with FIG. 2b (i.e., ESI being of relatively high inductance);

FIG. 2g shows the waveform of the current flowing through energy-storing inductor ESI1 under the condition associated with FIG. 2c (i.e., ESI1 being of medium inductance); and FIG. 2h shows the waveforms of the current flowing through energy-storing inductor ESI1 under the condition associated with FIG. 2d (i.e., ESI1 being of relatively low inductance).

When the fluorescent lamp (FL) is either inoperative of disconnected, for a situation where the inductance of energy-storing inductor ESI1 is of a medium magnitude:

FIG. 2i shows the waveform of the squarewave voltage present between the B— bus and the collector of transistor Q1; and FIG. 2j shows—for each of the three different values of the instantaneous magnitude of the DC supply voltage—the waveform of the current flowing through energy-storing inductor ESI1.

With reference to the waveforms of FIG. 2, the operation of the circuit arrangement of FIG. 1 may be explained as follows.

Except for the biasing arrangement associated with bias capacitors BC1 and BC2, the inverter of FIG. 1—which consists of main circuit elements Q1/Q2, CT1/CT2 and AT, and which is powered from the DC voltage present across energy-storing capacitor ESC—operates in a substantially conventional manner, similar to that of the inverter circuit of FIG. 4 in U.S. Pat. No. 4,184,128 to Nilssen. However, in contrast with Nilssen's arrangement, the inverter of FIG. 1 need not be triggered into oscillation. Rather, it will start oscillations by itself as a result of the initial bias current provided via bias resistors BR1 and BR2.

The indicated biasing arrangement, which consists of bias capacitors BC1/BC2 and a bias current leakage means which includes leakage resistor LR and control transistor CQ1, operates such as to control the magnitude of the negative bias developing on each of the two bias capacitors as a result of the base current provided to each of the two switching transistors (Q1/Q2). If the magnitude of the negative bias on each of the bias capacitors is caused to increase, the inverter frequency increases; if the magnitude of the negative bias is caused to decrease, the inverter frequency decreases.

More particularly, the magnitude of the negative bias is controlled by the amount of current that is allowed to leak away from the bias capacitors via leakage resistor LR and control transistor CQ1.

With control transistor CQ1 non-conductive, the negative bias developing on bias capacitors BC1/BC2 (as a result of the base current provided to the bases of transistors Q1/Q2) will increase rapidly and—with the circuit components actually used—to a point where the oscillation will choke itself off. Thereafter, the highly negative bias having been developed on each of the bias capacitors will slowly leak off via bias resistors BR1/BR2; and a point will eventually be reached where the inverter will again start oscillating, only to choke itself off again; etc.

Thus, with control transistor CQ1 non-conductive, the inverter will operate in a so-called squegging mode: it will oscillate for a brief period; whereafter it will remain non-oscillatory for an extended period of time; whereafter it will again oscillate for a brief period; etc.

With control transistor CQ1 fully conductive, the magnitude of the negative bias on bias capacitors BC1/BC2 will be prevented from increasing so much as to cause the inverter to squegg. Instead, by choice of the resistance value of leakage resistor LR, the magnitude of the negative bias is so limited as to cause the inverter to stably oscillate at a frequency appropriate to power the fluorescent lamp FL at the desired level. In an actual embodiment, the magnitude of the negative bias voltage was limited to about 1.5 Volt, at which point the frequency of inverter oscillation was about 25 kHz and the power provided to the fluorescent lamp means (FL) was about 50 Watt.

With the inverter oscillating at 25 Khz, and with control transistor CQ1 fully conductive, the inverter output voltage —which is provided between transformer terminals TT1 and TT2 —will be as indicated by FIG. 2e in terms of the voltage present at terminal TT1.

During normal inverter operation, transistors Q1/Q2 will alternatingly constitute a short circuit to the B— bus. Thus, transistor Q1 constitutes a short circuit to the B— bus each time the instantaneous magnitude of the voltage of FIG. 2e is zero. Each time transistor Q1 constitutes such a short circuit, current will flow through energy-storing inductor ESI1—as indicated by FIG. 2f-j—and energy-storing inductor ESI1 will be charged. As for instance seen in FIG. 2h, the magnitude to which the current will grow increases linearly with the duration over which it is allowed to grow.

The current waveforms of FIG. 2f-j are shown for three different instantaneous magnitudes of the DC voltage present between the B— bus and terminal DC+; which is the DC voltage operative to charge energy-storing inductors ESI1/ESI2. The first of the three groups of current waveforms corresponds to a point in time where the magnitude of the DC voltage is half as large as that of the DC voltage associated with the second group; and the second group, in turn, corresponds to a point in time where the magnitude of the DC voltage is half as large as that of the DC voltage associated with the third group. Thus, the magnitude to which the current in the energy-storing inductors will grow is a linear function of the magnitude of the DC voltage present across these inductors—i.e., the DC charging voltage.

As an overall result, for a given inductance value, the average current flowing through the energy-storing inductors will increase linearly with the magnitude of the DC voltage present between the DC− terminal and the DC+ terminal; which means that the magnitude of the current drawn from the power line—to the extent it is drawn through energy-storing inductors ESI1-/ESI2—will be proportional to the instantaneous magnitude of the power line voltage; which, in turn and in effect, corresponds to a power factor of 100% and a total harmonic distortion of 0%.

The effect of power rectifier PR1 is that of charging energy-storing capacitor ESC directly from the DC+ terminal, thereby by-passing the forward conversion process. However, such direct charging of capacitor ESC can only occur whenever the magnitude of the DC voltage at the DC+ terminal is larger than the magnitude of the DC voltage present at capacitor ESC; which, in turn, can only occur when the power transferred to capacitor ESC by forward conversion is less than that being supplied by the inverter to its load (fluorescent lamp FL).

As indicated by FIG. 2b, whenever the inductance of energy-storing inductors ESI1/ESI2 is relatively high, a significant amount of energy—as indicated by the area of the narrowly peaked part (i.e., the spike) of the waveform—is provided directly from terminal DC+ to capacitor ESC. This energy flows directly from the DC+ terminal, through power rectifier PR1 to the B+ terminal.

Of course, as may be seen by direct inspection of the waveform of FIG. 2b, the values for power factor and harmonic distortion associated with the power line current of FIG. 2b are not highly desirable.

As indicated by the waveform of FIG. 2d (which, due to the complete absence of a charging spike, indicates that no direct charging of capacitor ESC takes place), whenever the inductance of energy-storing inductors ESI1/ESI2 is relatively low, all the energy provided to capacitor ESC (i.e., to the load) is provided via forward conversion. As a result, as may be seen by direct inspection of the waveform of FIG. 2d, the values for power factor and harmonic distortion associated with the power line current are highly desirable: essentially 100% and 0%, respectively.

The situation associated with the waveforms of FIG. 2c corresponds to that of the preferred embodiment; in which embodiment a certain part of the energy provided to capacitor ESC (i.e., to the load) is provided by direct charging via power rectifier PR1. By providing such certain part of the energy via direct charging, thereby correspondingly reducing forward conversion losses, a substantial improvement in energy efficiency results without any significant negative impact on the values for power factor and total harmonic distortion. In particular, the waveform of FIG. 2c corresponds to a power factor of over 98% and a total harmonic distortion of well under 20%; both of which values are highly desirable in terms of industry requirements.

As power is initially applied to the circuit arrangement of FIG. 1, capacitor ESC charges up to the peak magnitude of the power line voltage and current starts flowing through bias resistors BR1/BR2, thereby to cause transistors Q1/Q2 to become activated; which, as a result of the positive current feedback provided via saturable current transformers CT1/CT2, causes the inverter to start oscillating, thereby generating a squarewave voltage across main transformer winding MW. The absolute magnitude of this squarewave voltage will be exactly equal to twice that of the DC voltage on capacitor ESC.

As soon as the inverter starts to oscillate, a squarewave voltage of magnitude proportional to that of the DC voltage on capacitor ESC will be provided at terminals AW1/AW2 of auxiliary winding AW. This squarewave voltage is rectified by signal diodes SD1/SD2, and the resulting auxiliary DC voltage provides—via resistor Rc—base current to transistor CQ1 of sufficient magnitude to cause this transistor to become fully conductive, thereby providing for leakage resistor LR to prevent the negative bias on bias capacitors BC1/BC2 from becoming excessive.

During normal fully-loaded operation, the magnitude of the DC voltage across capacitor ESC is too low to cause the magnitude of the squarewave voltage provided at terminals AW1/AW2 of auxiliary winding AW to be so high as to cause Zener diode Z to conduct; which therefor means that, under normal fully-loaded operation, transistor CQ2 remains non-conductive.

However, at a reduced load, if the magnitude of the DC voltage across capacitor ESC were to increase to a level high enough to cause Zener diode Z to conduct, transistor CQ2 will start receiving base current; which base current will cause it to conduct, thereby to cause transistor CQ2 to rob some of the base current provided to the base of transistor CQ1; thereby, in turn, to cause a reduction in the conduction of transistor CQ1; thereby to permit the negative bias on bias capacitors BC1/BC2 to increase to higher levels; thereby to cause the inverter frequency to increase—eventually to the point of limiting the charging of capacitor ESC to a point where the magnitude of the DC voltage across it ceases to increase.

The Zener voltage of Zener diode Z is so selected as to permit the magnitude of the DC voltage across capacitor ESC to increase to a certain level (i.e., a level somewhat higher than that corresponding to the peak magnitude of the power line voltage) before base current starts to be provided to transistor CQ2. Thus, after the magnitude of this DC voltage exceeds this certain level, a negative feedback effect occurs; by which negative feedback effect the inverter frequency is caused to increase enough to prevent the magnitude of the DC voltage across capacitor ESC from exceeding a predetermined level.

Without providing for the indicated negative feedback effect, at light loads, the forward conversion may provide for enough power to cause the magnitude of the DC voltage across capacitor ESC to increase far beyond the indicated predetermined level. In fact, this magnitude would be apt to increase to destructively high levels.

In case no loading were to be provided at the inverter output, the indicated negative feedback effect would cause the inverter to enter a squegging mode: it would oscillate for a brief period, thereby causing the magnitude of the DC voltage across capacitor ESC to increase to the point of causing Zener diode Z to conduct enough to cause transistor CQ1 to become totally non-conductive; which, in turn, will permit enough negative bias to build up on bias capacitors BC1/BC2 to cause the inverter to choke itself off, ceasing oscillating altogether until the negative bias on bias capacitors BC1/BC2 has been dissipated by leakage through bias resistors BR1/BR2.

The arrangement of FIG. 3 operates in the same basic manner as that of FIG. 1, except that the two separate energy-storing inductors ESI1/ESI2 of FIG. 1 have been replaced by a single center-tapped energy-storing inductor CTESI.

The arrangement of FIG. 4 represents a full bridge version of the arrangement of FIG. 1; but otherwise it operates in basically the same manner as does the arrangement of FIG. 1.

One important difference, however, is that the magnitude of the DC voltage across energy-storing capacitor ESC now should be at least twice that of the peak magnitude of the full-wave-rectified power line voltage. Thus, the arrangement of FIG. 4 does not—except on start-up—permit any charging of capacitor ESC directly from the DC+ terminal. Rather, all the energy used by the load has to be handled via forward conversion.

Another item to note is that the forward conversion is handled by transistors Qb and Qd as combined with rectifiers CRa and CRc. Transistors Qa and Qc are not used for the forward conversion; neither are rectifiers CRb and CRd. Thus, the magnitudes of the currents handled by elements Qb/Qd and CRa/CRc are substantially larger than those handled by elements Qa/Qc and CRb/CRd; which means that the current-handling capabilities of elements Qa/Qc and CRb/CRd may be relaxed compared with those of elements Qb/Qd and CRa/CRc.

The arrangement of FIG. 5 represents a half-bridge version of the arrangement of FIG. 1; but otherwise it operates in a manner similar to that of the arrangement of FIG. 1.

As with the arrangement of FIG. 4, the magnitude of the DC voltage across energy-storing capacitor ESC now should be at least twice that of the peak magnitude of the full-wave-rectified power line voltage. Thus, the arrangement of FIG. 5 does not—except on start-up—permit any charging of capacitors ESC1/ESC2 directly from the DC+ terminal. Rather, all the energy used by the load has to be handled via forward conversion. Moreover, forward conversion now takes place only during every other half-cycle of the inverter's oscillation; which results in a conversion current of peak magnitude twice as large as otherwise would be the case.

Also, in a manner similar to that of the arrangement of FIG. 4, transistor Qy and rectifier CRx handle all the currents associated with the forward conversion. Thus, the current handling requirements of elements Qx and CRy may be substantially relaxed as compared with those of elements Qy and CRx.

Additional Comments (a) The inverters of FIGS. 1, 3, 4 and/or 5 may be either of the self-oscillating type—as is indeed the arrangement of FIG. 1—or of the so-called driven type. In either case, it is important to provide for feedback means whereby the inversion frequency is caused to increase sharply if the magnitude of the DC supply voltage were to increase beyond a pre-determined level. Otherwise, circuit self-destruction would occur if the circuit were to be powered without being loaded.

(b) Details of the inverter drive and control circuit have only been shown in connection with the arrangement of FIG. 1. However, similar drive and control circuits can be used for the other arrangements shown.

(c) In FIGS. 3–5, the block labeled Inverter Control Circuitry is shown as having a connection with the B+ bus; which connection is meant to indicate that the Inverter Control Circuitry has to obtain information with respect to the magnitude of the DC supply voltage. In reality, such information can be obtained in various ways, such as via an auxiliary or secondary winding on an inverter output transformer—such as in the arrangement of FIG. 1.

(d) Fluorescent lamp FL is indicated to be of a so-called Instant-Start type; which type does not require an external supply of cathode heating power. However, if using so-called Rapid-Start fluorescent lamps, externally supplied cathode heating power would be required. In the arrangement of FIG. 1, such externally supplied cathode heating power may conveniently be obtained by adding secondary windings to auto-transformer AT.

(e) In the arrangement of FIG. 1, elements RR1 and RD1, which are series-connected across secondary winding CT1s of saturable current transformer CT1, serve the function of permitting the reverse or reset current provided from secondary winding CT1s to flow in such manner as not to affect the charge on bias capacitor BC1. That way, except for the minute amount of current provided via bias resistor BR1, all the current flowing into the base of transistor Q1 gets sucked out of bias capacitor BS1, thereby causing the bias voltage at junction J1 to grow ever more negative, except if allowed to leak away.

In a controlled manner—via leakage resistor LR and control transistor CQ1—the negative charge on bias capacitor BC1 it is indeed allowed to leak away. However, if the magnitude of the inverter DC supply voltage (i.e., the DC voltage on capacitor ESC) were to get too high, the leakage path through transistor CQ1 would be opened; and the magnitude of the negative bias on bias capacitor BC1 would increase to the point of causing the inverter to cease oscillating.

Of course, the situation with respect to elements RR2 and RD2—as associated with transistor Q2—is the same as for elements RR1 and RD1.

(f) It is believed that the present invention and its several attendant advantages and features will be understood from the preceeding description. However, without departing from the spirit of the invention, changes may be made in its form and in the construction and/or interrelationships of its component parts, the form herein presented merely representing the currently preferred embodiment.

I claim:

1. An arrangement comprising:
   a first set of DC supply terminals having a first DC voltage thereacross; the first DC voltage having a periodically varying magnitude;
   a second set of DC supply terminals having a second DC voltage thereacross; the second DC voltage having a substantially non-varying magnitude;
   an inverter connected with the second set of DC terminals; the inverter also being connected via an inductor means with the first set of DC terminals;

the inverter being operative to provide a squarewave voltage across a set of inverter output terminals; the squarewave voltage having a substantially non-varying magnitude; and gas discharge ligthing means connected in circuit with the inverter output terminals and operative to be powered therefrom by way of a current-limiting means;

the arrangement being so constituted that a substantial part of all the power supplied to the gas discharge lighting means is being supplied from the first set of DC supply terminals via the inductor means.

2. The arrangement of claim 1 wherein: (i) the first and the second set of DC terminals each has a first DC terminal and a second DC terminal; (ii) the first DC terminal of the first set of DC terminals is connected directly with the first DC terminal of the second set of DC terminals; and (iii) the second DC terminal of the first set of DC terminals is connected with the second DC terminal of the second set of DC terminals by way of a rectifier means.

3. The arrangement of claim 1 wherein the first DC voltage has an absolute instantaneous magnitude equal to that of the AC power line voltage on an ordinary electric utility power line.

4. The arrangement of claim 3 wherein the first DC voltage is obtained by non-filtered full-wave rectification of the AC power line voltage.

5. The arrangement of claim 1 wherein: (i) the inverter draws power from both sets of DC terminals; and (ii) periodically supplies power to the second set of DC terminals.

6. An arrangement comprising:
a source of DC voltage;
inverter means connected with the source of DC voltage and operative to provide an AC voltage at an inverter output; the inverter means having a first and a second switching transistor operative by way of switching action to generate the AC voltage; each switching transistor being operative to switch a unidirectional current; the magnitude of the unidirectional current being switched by the first switching transistor being substantially higher than that of the unidirectional current being switched by the second switching transistor; and
lighting means connected in circuit with the inverter output, thereby to be properly powered by the AC voltage provided thereat.

7. The arrangement of claim 6 wherein the inverter means is characterized by comprising an energy-storing inductor means as well as an energy-storing capacitor means.

8. The arrangement of claim 6 wherein the lighting means comprises a gas discharge lamp as well as a current-limiting reactance means.

9. The arrangement of claim 6 wherein the inverter means additionally comprises a third and a fourth switching transistor.

10. An arrangement comprising:
a source of relatively low frequency AC voltage;
rectifier connected with the source and operative to provide a DC voltage at a pair of DC terminals; the DC voltage being amplitude-modulated, its absolute instantaneous magnitude being approximately equal to that of the low frequency AC voltage;
inverter means connected with the DC terminals by way of an energy-storing inductor means; the inverter means being operative to provide across a pair of inverter output terminals a relatively high frequency non-amplitude-modulated AC voltage; and
lighting means connected in circuit with the inverter output terminals, thereby to be properly powered by the high frequency AC voltage provided thereat.

11. The arrangement of claim 10 wherein the inverter means comprises energy-storing capacitor means.

12. An arrangement comprising:
rectifier means connected with the AC voltage of an ordinary electric utility power line and operative to provide a DC voltage at a set of DC terminals;
a gas discharge lamp means; and
inverter and ballasting means connected in circuit with the DC terminals as well as with the lamp means; thereby to cause a relatively high frequency lamp current to flow through the gas discharge lamp means, and a relatively low frequency line current to be drawn from the power line; the line current being characterized by having a periodic waveform that is substantially sinusoidal except for a current pulse being added at or near the peak of each half-cycle of the substantially sinusoidal waveform; each half-cycle having a half-period; each current pulse having a pulse-period; the duration of each pulse-period being substantially shorter than the duration of each half-period.

13. An arrangement comprising:
a source of DC supply voltage;
inverter means connected with the DC supply voltage and operative to provide an AC voltage at an inverter output; the inverter means having control means operative, in response to a control signal, to change the frequency of the AC voltage; sensor means operative to sense when the magnitude of the DC supply voltage exceeds a predetermined level and then, if this magnitude does indeed exceed said predetermined level, to provide said control signal; thereby to cause the frequency of the AC voltage to increase to a degree approximately commensurate with the degree to which the magnitude of the DC supply voltage exceeds said predetermined level; and
lighting means connected with the inverter output and operative to absorb an amount of power from the inverter output; the amount of power absorbed being an inverse function of frequency;
whereby the amount of power absorbed by the lighting means decreases when the magnitude of the DC supply voltage is caused to increase beyond said certain level.

14. The arrangement of claim 13 wherein: (i) the magnitude of the DC supply voltage is caused to increase in case the lighting means were to be disconnected from the inverter output; and (ii) the control means is additionally operative to cause the inverter means to enter an intermittent mode of operation in case the lighting means indeed were to be so disconnected.

* * * * *